(12) United States Patent
Smuk

(10) Patent No.: US 7,360,838 B2
(45) Date of Patent: Apr. 22, 2008

(54) ROTARY RECLINER MECHANISM FOR USE WITH A VEHICLE SEAT ASSEMBLY

(75) Inventor: Wojciech Smuk, Troy, MI (US)

(73) Assignee: Faurecia Automotive Seating Canada Limited, Mississauga, Ontario (CA)

( * ) Notice: Subject to any disclaimer, the term of this patent is extended or adjusted under 35 U.S.C. 154(b) by 55 days.

(21) Appl. No.: 11/364,199

(22) Filed: Mar. 1, 2006

(65) Prior Publication Data
US 2006/0202537 A1 Sep. 14, 2006

Related U.S. Application Data

(60) Provisional application No. 60/657,741, filed on Mar. 3, 2005.

(51) Int. Cl.
*B60N 2/02* (2006.01)
(52) U.S. Cl. ...................................... 297/367
(58) Field of Classification Search .............. 297/367
See application file for complete search history.

(56) References Cited

U.S. PATENT DOCUMENTS

| | | | |
|---|---|---|---|
| 5,685,611 A * | 11/1997 | Eguchi et al. | 297/367 |
| 6,007,152 A * | 12/1999 | Kojima et al. | 297/367 |
| 6,007,153 A | 12/1999 | Benoit et al. | |
| 6,312,053 B1 | 11/2001 | Magyar | |
| 6,336,679 B1 | 1/2002 | Smuk et al. | |
| 6,609,756 B2 | 8/2003 | Kojima et al. | |
| 6,626,495 B2 * | 9/2003 | Okazaki et al. | 297/367 |
| 6,629,733 B2 | 10/2003 | Matsuura et al. | |
| 6,641,217 B2 | 11/2003 | Yamada et al. | |
| 6,648,414 B2 | 11/2003 | Ikegaya et al. | |
| 6,666,515 B2 | 12/2003 | Asano et al. | |
| 6,715,835 B2 | 4/2004 | Hoshihara et al. | |
| 6,722,738 B2 | 4/2004 | Uramichi | |
| 6,742,844 B2 | 6/2004 | Pollack | |
| 6,749,263 B2 | 6/2004 | Peters | |
| 6,755,471 B2 | 6/2004 | Hoshihara et al. | |
| 6,758,525 B2 | 7/2004 | Uramichi | |
| 6,786,550 B2 | 9/2004 | Uramichi | |
| 6,854,802 B2 | 2/2005 | Matsuura et al. | |

(Continued)

FOREIGN PATENT DOCUMENTS

CA 2338514 2/2000

(Continued)

*Primary Examiner*—Sarah B. McPartlin
(74) *Attorney, Agent, or Firm*—Patrick J. Hofbauer; Kevin E. Holbeche

(57) ABSTRACT

A rotary recliner includes rotatable plate members that pivotally interconnect a vehicle seat back and cushion. A pawl defines a pawl axis and slides between a guide pair on one plate member. An outer end of the pawl includes a gear segment that is lockable with a ring gear on the other plate member. A cam rotates between locked and unlocked positions, and has a camming surface eccentric of the pivot axis. When locked, the camming surface engages a cam-follower surface on the pawl, with the pawl being engaged by the cam solely at the cam-follower surface, and with the pawl axis being askew of a radial axis, such that the gear segment locks with the ring gear, and such that the plate members are restrained from rotating. When unlocked, the gear segment is removed from the ring gear, such that the plate members may be rotated.

17 Claims, 15 Drawing Sheets

U.S. PATENT DOCUMENTS

| | | | |
|---|---|---|---|
| 6,880,887 B2 | 4/2005 | Hoshihara et al. | |
| 7,165,813 B2* | 1/2007 | Tame | 297/367 |
| 2003/0025376 A1 | 2/2003 | Mortyama et al. | |
| 2003/0085603 A1 | 5/2003 | Lee et al. | |
| 2003/0098599 A1* | 5/2003 | Baloche | 297/367 |
| 2003/0178878 A1 | 9/2003 | Hoshihara et al. | |
| 2003/0230923 A1 | 12/2003 | Uramichi | |
| 2004/0061369 A1* | 4/2004 | Reubeuze et al. | 297/367 |
| 2004/0066078 A1 | 4/2004 | Matsuura et al. | |
| 2004/0084945 A1* | 5/2004 | Toba et al. | 297/367 |
| 2004/0113475 A1 | 6/2004 | Uramichi et al. | |
| 2005/0073185 A1 | 4/2005 | Uramichi | |
| 2005/0127732 A1 | 6/2005 | Peters | |
| 2006/0145523 A1* | 7/2006 | Yamada | 297/367 |
| 2007/0108825 A1* | 5/2007 | Yamada et al. | 297/367 |

FOREIGN PATENT DOCUMENTS

| | | |
|---|---|---|
| CA | 2369034 | 7/2002 |
| CA | 2374798 | 9/2002 |
| CA | 2387393 | 11/2002 |
| DE | 198 32 028 | 1/1999 |
| DE | 102 53 054 | 6/2004 |
| WO | WO 2004/043733 | 5/2004 |

* cited by examiner

ROTARY RECLINER MECHANISM FOR USE WITH A VEHICLE SEAT ASSEMBLY

FIELD OF THE INVENTION

The present invention relates to the field of vehicle seat assemblies, and more particularly, to a rotary recliner for pivotally interconnecting a seat back member and a seat cushion member of a vehicle seat assembly.

BACKGROUND OF THE INVENTION

Automotive vehicles commonly have seat assemblies that permit the seat back to be selectively reclined, about a horizontal pivot axis, through a range of substantially upright, occupiable positions for selection by the user of a preferred seating position. In the past, rotary recliner mechanisms have proven an effective way to provide such reclining functionality in vehicle seat assemblies. Advantages of known rotary recliner mechanisms include that they are relatively inexpensive to manufacture, that they have their working components substantially enclosed (which lends to their reliability and safety), and that they fit into a relatively small design envelope. One prior art rotary recliner mechanism is disclosed in U.S. Pat. No. 6,336,679 (Smuk et al.), issued Jan. 8, 2002, which is incorporated herein by reference.

Rotary recliners for vehicle seats typically include fixed and mobile plates, with the fixed plate being mounted on the seat cushion and the mobile plate mounted on the seat back. Generally, in the prior art, the mobile plate is rotatably supported by the fixed plate and may be selectively locked relative thereto. Typically, when locked, a toothed gear segment on a pawl that is supported by the fixed plate securely engages a corresponding toothed ring gear provided on the mobile plate.

Notably, in attempting to lock the mobile plate relative to the fixed plate, some prior art rotary recliners have exhibited a certain small range of non-locking conditions. In the result, the seat back may not have locked instantly when the recliner handle was released, instead requiring a slight rearward or forward force to positively lock the recliner. While such rearward and forward forces are generally generated during normal vehicle movement, the free play in the seat back that is inherent during these non-locking conditions of the recliner may be troubling, inter alia, from a safety perspective. Though not essential to an understanding of the present invention, it is generally thought that the non-locking conditions in some prior art rotary recliners may be attributable to the design of the toothed gear segments and the toothed ring gear, and/or to an orientation of the pawls relative to the ring gear. That is, and for example, when the profile of the teeth on the gear segment is identical to that of the teeth on the ring gear, a non-locking (or tip-to-tip) condition may occur. In such situations, the teeth on the ring gear may actually collide with the teeth on the gear segment, thereby preventing the mobile and fixed plates from locking with respect to one another. More specifically, in such tip-to-tip conditions, teeth on opposite outside end portions of the gear segment may engage opposing faces of the corresponding teeth on the ring gear, thereby requiring a slight rearward or forward force on the seat back, and/or a slight rotational force on the mobile plate, to positively lock the recliner. It would be desirable to provide a rotary recliner that has a lower incidence of such non-locking (tip-to-tip) conditions.

One prior art rotary recliner mechanism that has attempted to address the aforementioned problem is disclosed in U.S. Pat. No. 6,749,263 (Peters), issued Jun. 15, 2004. Notably, prior art rotary recliner mechanisms of the general type that are disclosed by the Peters patent have stipulated the essentiality of rotatable eccentric cams which must apply an equilibrium of forces to each of the pawls, through a balanced arrangement of two cam shoulders provided on each of the pawls. Though not essential to an understanding of the present invention, the tolerancing that has heretofore been required between the cams and the cam shoulders of such prior art rotary recliners, in order to effect the purportedly required balanced distribution of forces, has generally been seen to be costly and difficult to achieve in mass-production, with a relatively high incidence of component rejection and/or failure. It would be desirable to provide a rotary recliner that is both highly reliable and cost effective, while at the same time affording a low incidence of non-locking conditions.

Accordingly, it is an object of this invention to obviate or mitigate at least one of the above-mentioned disadvantages of the prior art.

SUMMARY OF THE INVENTION

In accordance with the present invention there is disclosed a rotary recliner mechanism for pivotally interconnecting a seat back member and a seat cushion member of a vehicle seat assembly. The rotary recliner mechanism includes first and second plate members that are adapted to be securely mounted one each on the seat cushion member and the seat back member. The second plate member is rotatably supported by the first plate member so as to define a substantially horizontal seat pivot axis. A ring gear is formed on the second plate member, and a first pair of elongate guide members is formed on the first plate member. The pair of guide members defines a guide channel therebetween that is oriented along a substantially radial axis. The rotary recliner mechanism also includes an elongate first locking pawl that has a longitudinal pawl axis and is disposed within the guide channel for sliding movement therealong. The pawl has inner and outer end portions, with the outer end portion located radially outward of the inner end portion. The outer end portion has a gear segment formed thereon that is engagable with the ring gear in locked relation. The pawl also has a pair of opposite side edges slidably engageable with the pair of elongate guide members. Each of the opposite side edges extends between the inner and outer end portions. The pawl additionally has a driven lobe arranged on the inner end portion in substantially off-set relation from the longitudinal pawl axis. The driven lobe includes a cam-follower surface. The rotary recliner mechanism additionally includes a cam member that is mounted for rotation about the pivot axis between a locked position and an unlocked position relative to the first and second plate members. The cam member has a first foot portion that is provided with an active lobe arranged thereon. The active lobe includes a camming surface that is arranged eccentrically of the pivot axis and is engagable with the cam-follower surface. According to the invention, in the locked position, the camming surface engages the cam-follower surface, with the pawl being engaged by the cam member solely at the cam-follower surface, and with the longitudinal pawl axis being substantially askew (hereinafter, alternately referred to as "angularly offset") relative to the radial axis, such that the gear segment securely engages the ring gear in the locked relation, and such that rotation of the second plate member about the pivot axis is substantially restrained relative to the first plate member. In the unlocked position, the gear segment is removed from the ring gear, so as to enable rotation of the second plate member about the pivot axis relative to the first plate member. In this manner, rotation of the cam member selectively controls pivotal movement of the seat back member about the pivot axis relative to the seat cushion member.

According to one aspect of a preferred embodiment of the invention, each of the side edges preferably comprises an intermediate shoulder portion, so as to define, between the opposite side edges of the pawl, first and second pawl widths substantially adjacent to the inner end portion and to the outer end portion respectively. According to this aspect of the invention, the second pawl width is preferably greater than the first pawl width.

According to another aspect of a preferred embodiment of the invention, in the locked position, each of the opposite side edges preferably engages a respective one of the guide members in substantially abutting relation. A first one of the opposite side edges preferably engages its respective one of the guide members substantially adjacent to the inner end portion. A respective other one of the side edges preferably engages its respective one of the guide members substantially adjacent to the outer end portion.

According to another aspect of a preferred embodiment of the invention, the ring gear includes a plurality of teeth defining a first pitch radius, and the gear segment includes a plurality of pawl teeth defining a second pitch radius. According to this aspect of the invention, the second pitch radius is preferably smaller than the first pitch radius.

According to another aspect of a preferred embodiment of the invention, the second pitch radius defines a pitch center that, in the locked position, is in substantially off-set relation from the radial axis.

According to another aspect of the invention, the foot portion of the cam member may preferably, but need not necessarily, be further provided with a passive lobe arranged thereon. The passive lobe includes a safety stop surface. The pawl preferably has a back-up lobe arranged on the inner end portion, preferably in substantially off-set relation from the longitudinal pawl axis and/or in substantially opposing relation to the driven lobe. The back-up lobe includes a back-up surface. According to this aspect of the invention, the back-up surface is preferably adapted to engage the safety stop surface during a mechanism overload event.

According to another aspect of the invention, the rotary recliner mechanism may preferably, but need not necessarily, include second and third locking pawls and corresponding second and third pairs of guide members. Each of the second and third locking pawls and the second and third pairs of guide members is preferably substantially identical in structure to the first locking pawl and to the first pair of guide members respectively. The cam member preferably also has second and third foot portions, with each of the second and third foot portions being substantially identical in structure to the first foot portion. As such, the second and third foot portions respectively interact with the second and third locking pawls in a functionally analogous manner to the first foot portion with the first locking pawl.

According to another aspect of the invention, the first locking pawl may preferably, but need not necessarily, be spaced 120 degrees about said pivot axis from each of said second and third locking pawls.

According to another aspect of the invention, the first plate member may preferably, but need not necessarily, be adapted to be securely mounted on the seat cushion member.

According to this aspect of the invention, the second plate member is adapted to be securely mounted on the seat back member.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the rotary recliner mechanism for use with a vehicle seat assembly according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
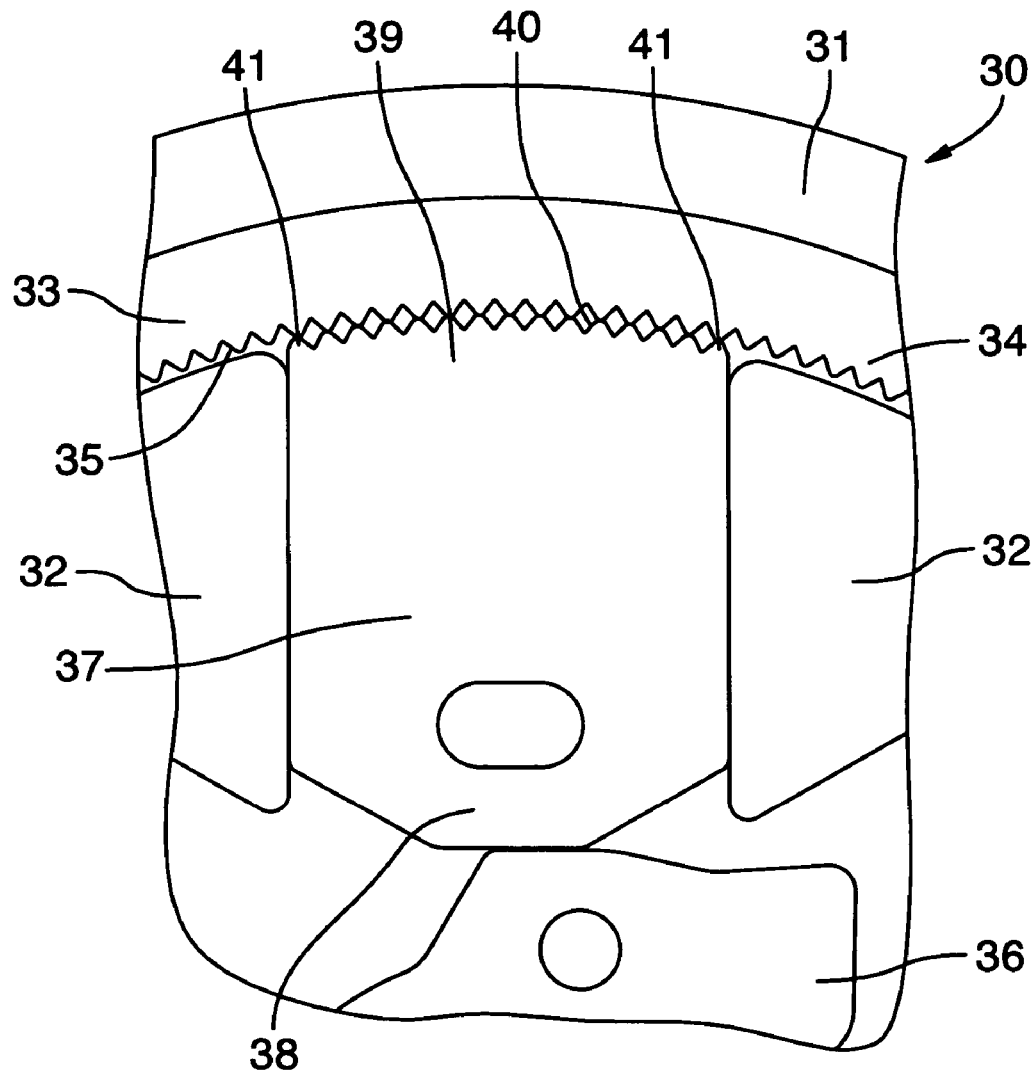
FIG. 1 is an enlarged sectional view of a rotary recliner mechanism according to the prior art.

Generally, in the prior art, and with general reference to FIG. 1, rotary recliners 30 have heretofore included a fixed plate 31 rotatably supporting a mobile plate 33. Typically, the fixed and mobile plates 31, 33 have respectively been mounted on a vehicle seat cushion and a seat back (not shown). Relevant portions of one such prior art rotary recliner 30 are shown in FIG. 1. The rotary recliner 30 shown in FIG. 1 includes a rotatable cam 36 that is engagable with an inner end 38 of a pawl 37. As shown in FIG. 1, the pawl 37 is supported between guides 32 provided on the fixed plate 31, and each pawl 37 includes a toothed gear segment 39. In the prior art, the toothed gear segment 39 has been designed to be selectively and securely engagable with a corresponding toothed ring gear 34 provided on the mobile plate 33. As described in greater detail elsewhere herein, however, it has thus far been difficult to ensure the desired locking of the mobile plate 33 relative to the fixed plate 31.

FIG. 1 shows the prior art rotary recliner 30 in one non-locking condition which may have been particularly problematic in the past. Notably, the profile of the pawl teeth 40 on the gear segment 39 shown in FIG. 1 is substantially identical to that of the teeth 35 on the ring gear 34. In such situations, and as can be seen in FIG. 1, the pawl teeth 40 and the teeth 35 on the ring gear 34 are in obstructing collision with one another, thus preventing the mobile plate 33 from immediately locking with respect to the fixed plate 31. More particularly, it will be appreciated from a close consideration of FIG. 1 that the pawl teeth 40 on opposite outside end portions 41,41 of the gear segment 39 are in engagement with opposing faces of corresponding teeth 35 on the ring gear 34. In the non-locking condition shown in FIG. 1, the attached seat back (not shown) would have required a slight rearward or forward force to have been applied thereto, resulting in a slight rotational force having been applied to the mobile plate, so as to positively lock the prior art rotary recliner 30.

Referring now to FIGS. 2 through 10, there is shown a rotary recliner mechanism 50 according to a preferred embodiment of the present invention. From FIG. 2, where the rotary recliner mechanism 50 is shown in its preferable use with a vehicle seat assembly 20, it will be appreciated that the rotary recliner mechanism 50 is designed to pivotally interconnect a seat back member 26 and a seat cushion member 22. More specifically, and as is generally well-known in the art, the rotary recliner mechanism 50 pivotally interconnects a seat cushion sector plate 24 on a seat cushion frame (not shown) within the seat cushion member 22, with a seat back sector plate 28 on a seat back frame (not shown) within the seat back member 26.

Figure 8:
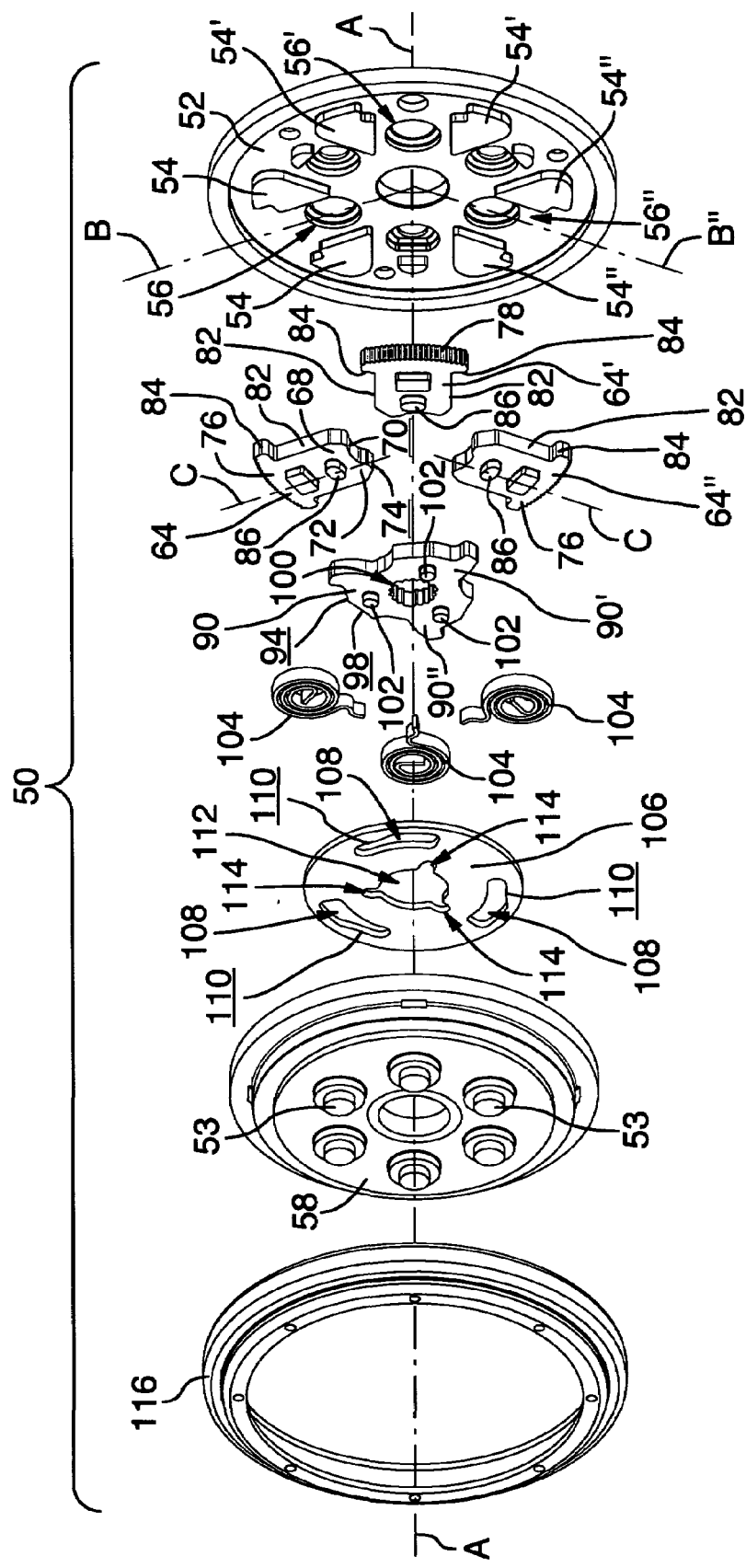
FIG. 8 is an exploded rear left perspective view of the rotary recliner mechanism of FIG. 2.

Preferably, and as best seen in FIG. 8, the rotary recliner mechanism 50 includes first and second plate members 52, 58, three locking pawls 64, 64', 64", a cam member 88, three spring members 104, a mask member 106, and a circumferential fastening ring 116. Each of these components of the rotary recliner mechanism 50 will be described in detail hereinbelow, but it will be readily apparent to those skilled in the art that, alternately and among other things, differing numbers of pawls 64 and spring members 104 may be provided according to the invention.

Figure 2:
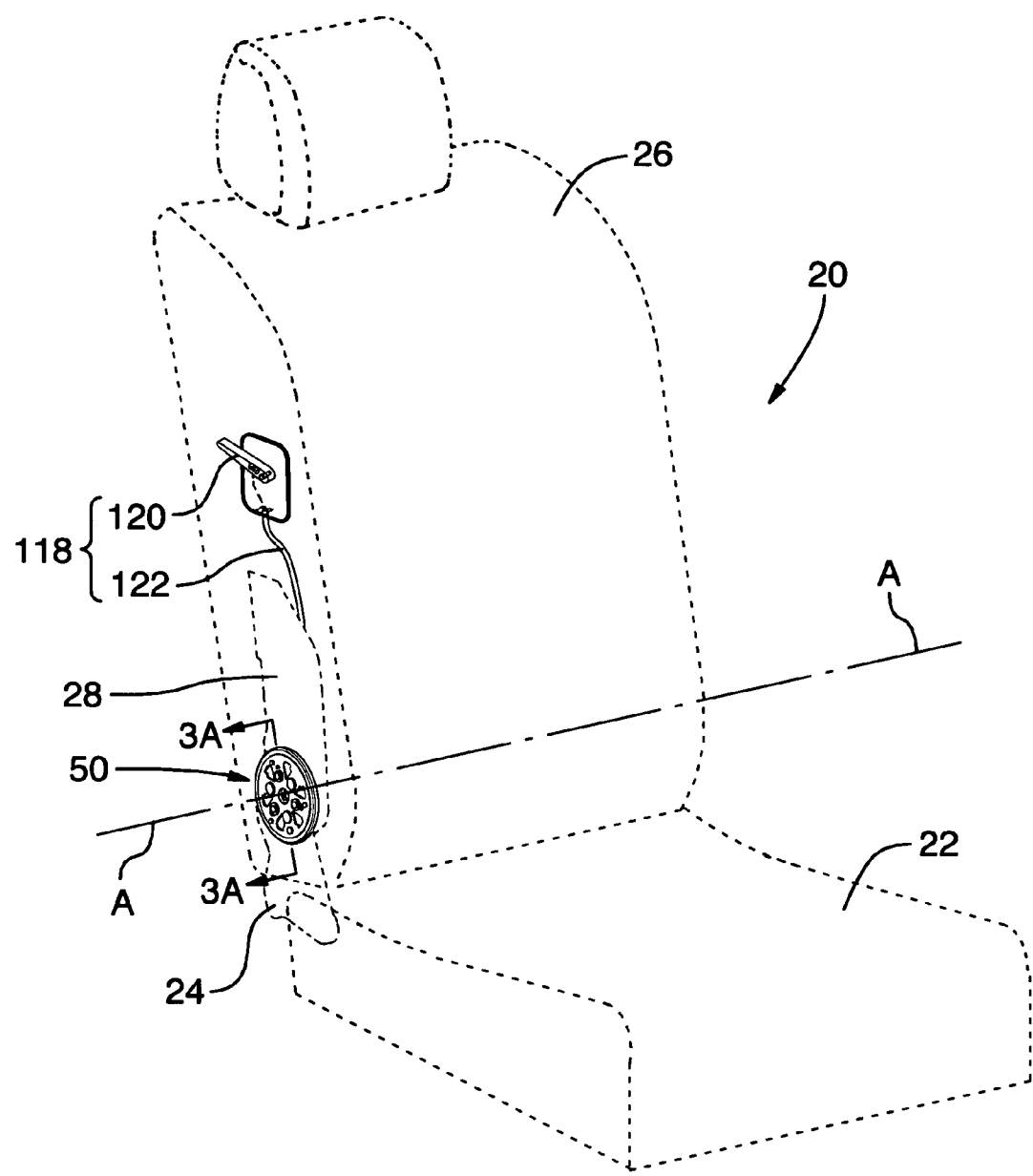
FIG. 2 is a top front right view of a rotary recliner mechanism according to the invention, with a vehicle seat assembly shown in phantom outline.
Figure 10:
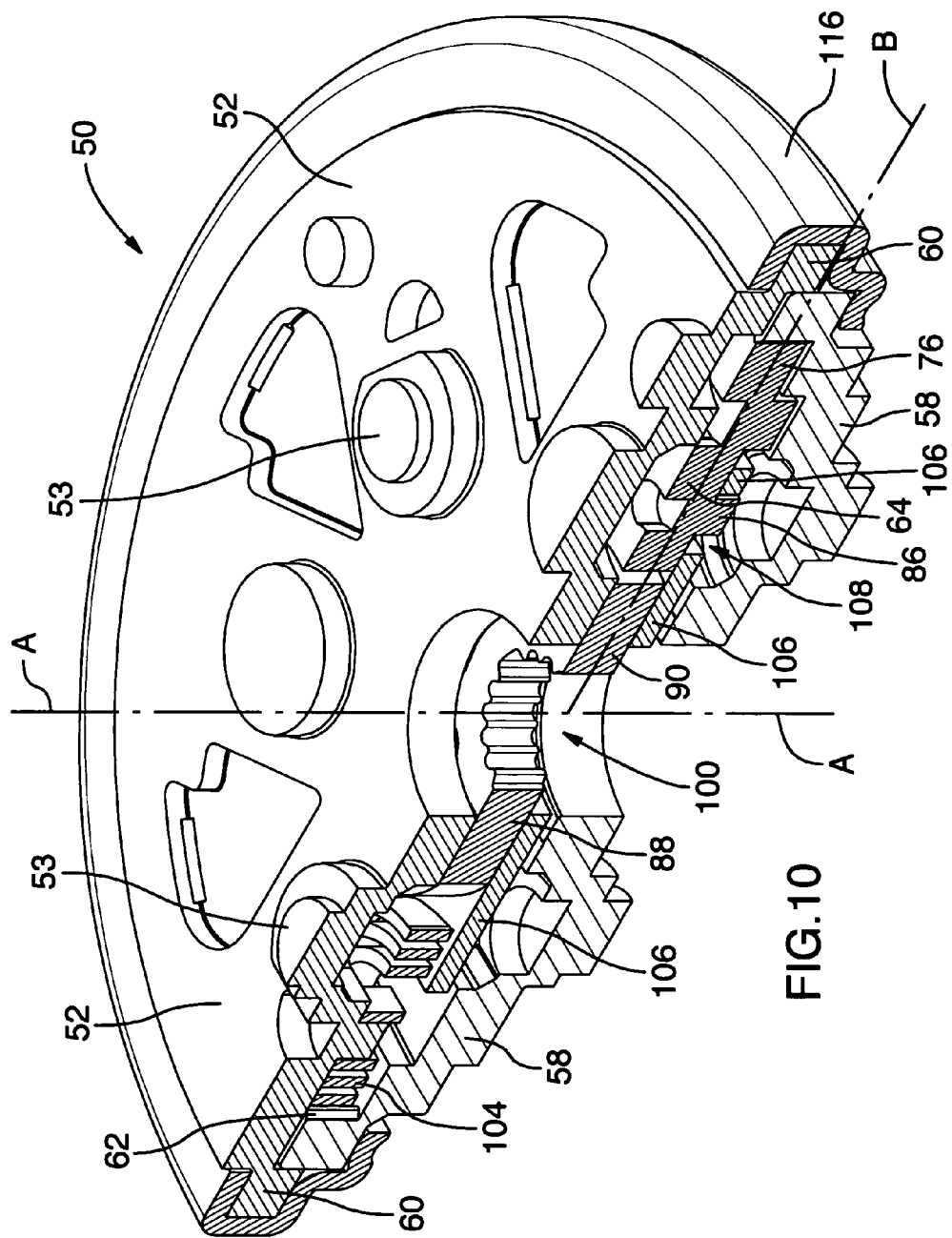
FIG. 10 is a sectional perspective view along a radial axis of the rotary recliner mechanism of FIG. 2.

As shown in FIG. 10, the fastening ring 116 rotatably connects the first and second plate members 52, 58 to one another, with the second plate member 58 rotatably supported by the first plate member 52, so as to define a substantially horizontal seat pivot axis "A" (as best seen in FIG. 2). Preferably, the first plate member 52 is securely mounted to the seat cushion sector plate 24, and the second plate member 58 is securely mounted to the seat back sector plate 28. More specifically, and as may be generally well-known in the art, each of the first and second plate members 52, 58 is preferably provided with a plurality of plate protuberances 53 (as best seen in FIGS. 8 and 10) which may be swaged or otherwise affixed to the seat cushion and seat back sector plates 24, 28 respectively. Of course, other fastening means (not shown) may alternately be used to affix the first and second plate members 52, 58 to the seat cushion and seat back members 22, 26 respectively.

Figure 9:
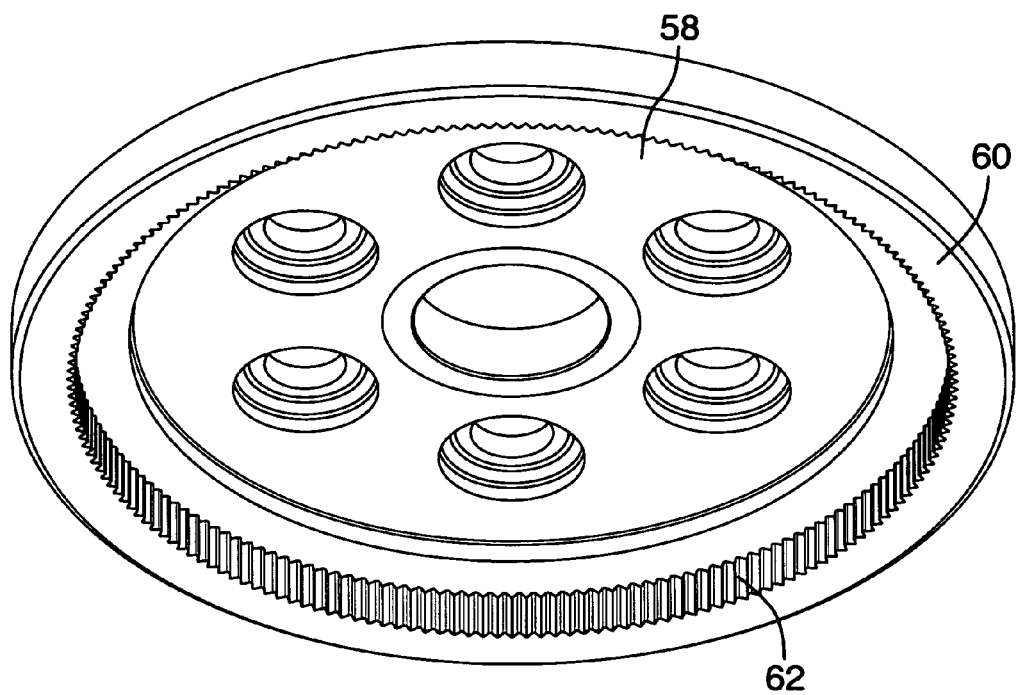
FIG. 9 is a front right perspective view of a mobile plate member shown in FIG. 8.

As best seen in FIG. 9, the second plate member 58 is preferably provided with a substantially circumferential internal ring gear 60, having a plurality of teeth 62, formed thereon. Notably, neither the teeth 60 nor the ring gear 60 need be substantially circumferential as described and shown in the drawings. Rather, the teeth 60 and/or the ring gear 60 might instead be provided only over a portion of the depicted circumference, such as to allow pivoting of the seat back member 26 within a desired range.

Figure 4A:
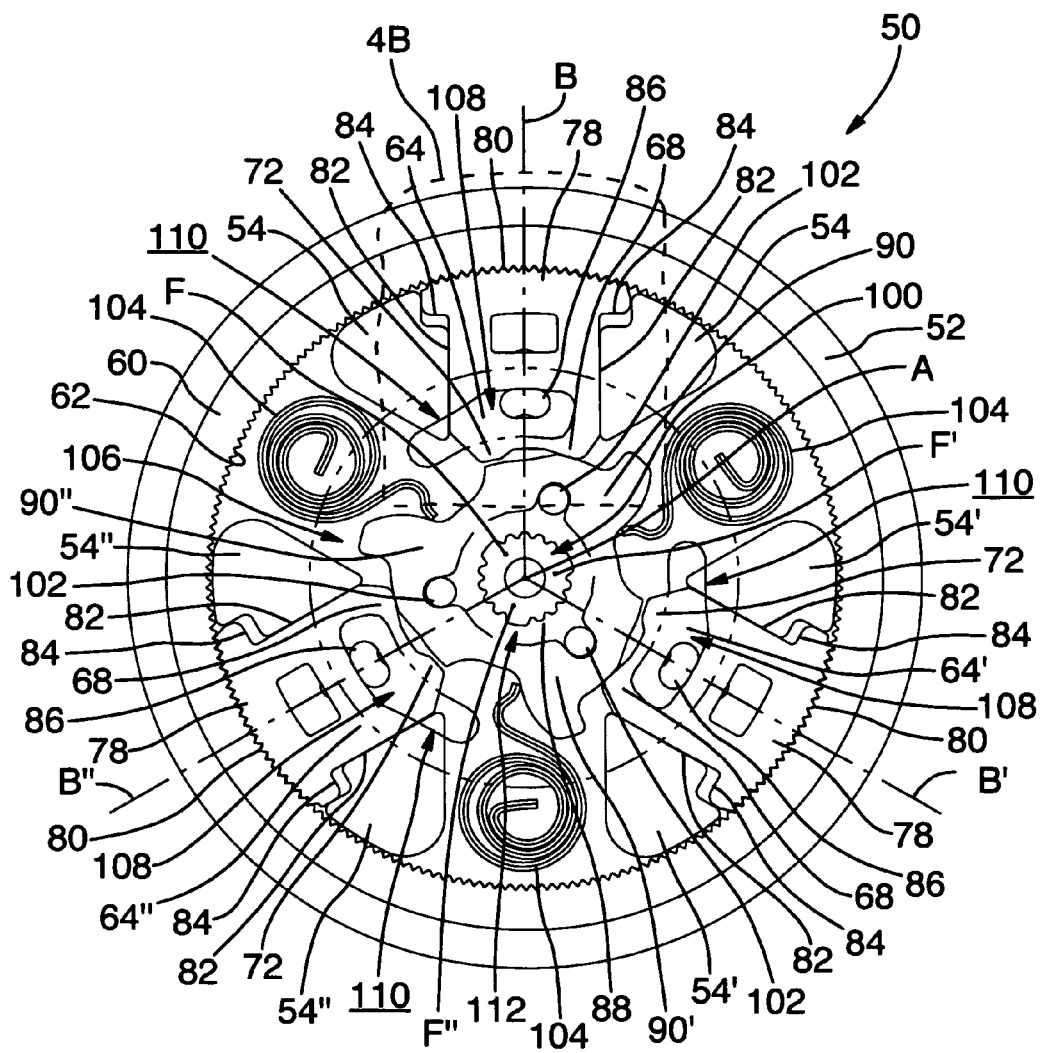
FIG. 4A is a view similar to FIG. 3A, with the rotary recliner mechanism shown in a design locked position.

As shown in FIG. 8, three elongate guide pairs 54,54, 54',54' and 54",54" are formed on the first plate member 52, each defining a respective guide channel 56 therebetween. As best seen in FIG. 4A, the guide channel 56 of each guide pair, 54,54, 54',54' and 54",54", is preferably oriented along a substantially radial axis, B, B' and B" respectively. The radial axes B, B', B" are preferably spaced one hundred and twenty degrees (120°) about the pivot axis "A" from one another.

The guide pairs, 54,54, 54',54' and 54",54", are substantially identical in structure to one another, and as such, references hereinafter to any single one of the guide pairs, 54,54, 54',54' and 54",54", should be interpreted to apply, with any necessary and/or minor variations, to each of the other guide pairs. Similarly, the locking pawls 64, 64', 64" are substantially identical in structure to one another, and as such, references hereinafter to any single one of the pawls 64, 64', 64" should be interpreted to apply, with any necessary and/or minor variations, to each of the other pawls.

As best seen in FIG. 8, each locking pawl 64 defines a respective longitudinal pawl axis C. As will be appreciated from a consideration of FIGS. 3A through 7B, each locking pawl 64 is disposed for sliding movement within the guide channel 56 defined by its respective guide pair 54,54. Each pawl 64 includes an outer end portion 76 that is located radially outward of an inner end portion 66 thereof. The outer end portion 76 has a gear segment 78 formed thereon. Each gear segment 78 includes a plurality of pawl teeth 80 that, as will be described in greater detail hereinbelow, selectively engage the teeth 62 on the ring gear 60 in locked relation.

Figure 3A:
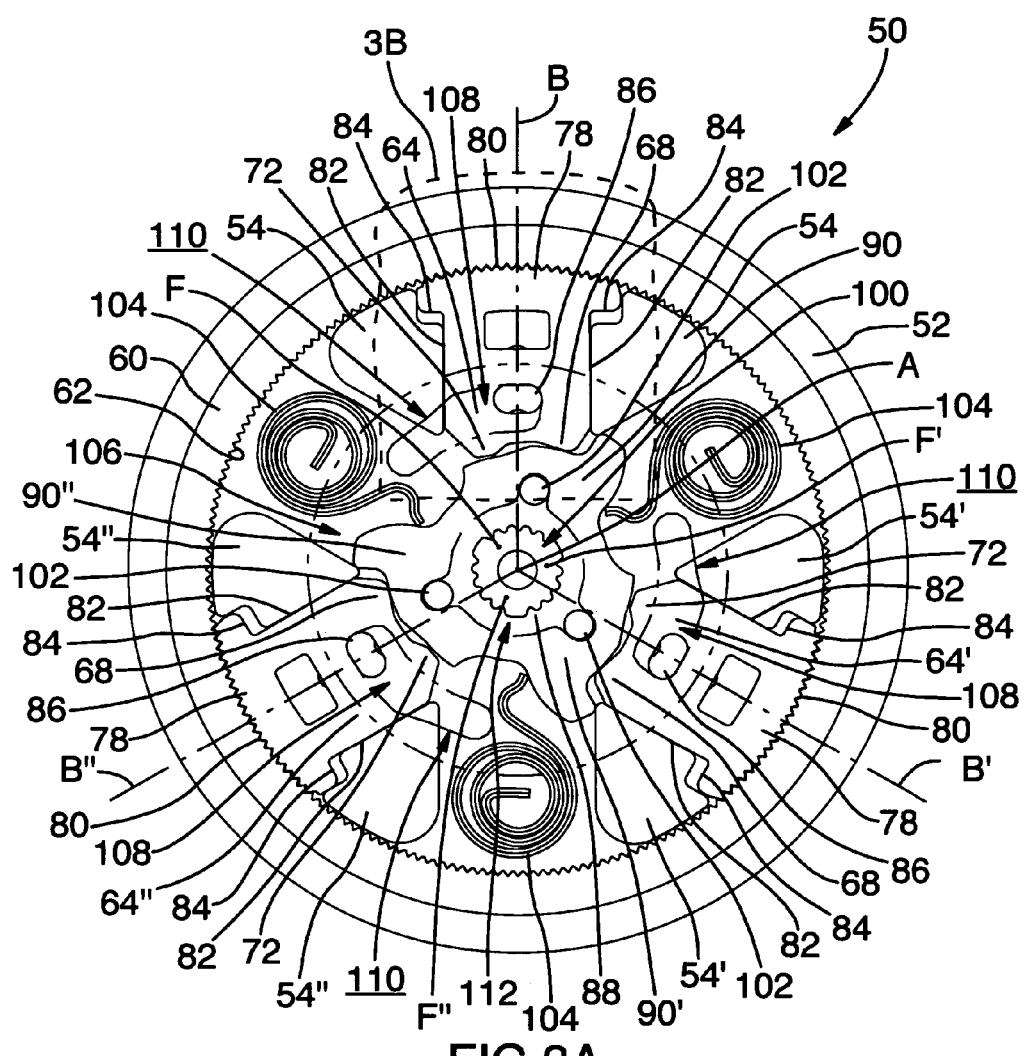
FIG. 3A is a sectional view of the rotary recliner mechanism of FIG. 2 along sight line 3A-3A, shown in a lock traversing position with a mask member thereof in phantom outline.

The pawl teeth 80 on each of the pawls 64, 64', 64" are located about a respective central point F, F', F" (as shown in FIG. 3A). The pawl teeth 80 are spaced about their respective central points F, F', F" by a substantially uniform distance so as to define a pawl pitch radius (not shown). Similarly, the teeth 62 on the ring gear 60 are spaced from the pivot axis "A" by a uniform distance so as to define a ring pitch radius (not shown). As best seen in FIG. 3A, the pawl pitch radius (the distance between the gear segment 64 and the central point F) is smaller than the ring pitch radius (the distance between the ring gear 60 and the pivot axis "A").

As best seen in FIGS. 3A through 7B, each pawl 64 also includes a pair of opposite side edges 82,82 that are slidably engagable one each with the corresponding guide pair 54,54. Each of the side edges 82,82 extends between the inner and outer end portions 66, 76. More particularly, and as best seen in FIG. 4B, each side edge 82 includes an intermediate shoulder portion 84 which divides the side edge 82 into outer and inner edges 85a, 85b. The outer and inner edges 85a, 85b are located substantially adjacent to the outer and inner end portions 76, 66 of the pawl 64, respectively.

An outer pawl width (as indicated generally by arrow "D" in FIG. 3B) is defined between the outer edges 85a, 85a of opposite side edges 82,82 on the pawl 64. Similarly, an inner pawl width (as indicated generally by arrow "E" in FIG. 3B) is defined between the inner edges 85b, 85b of opposite side edges 82,82 on the pawl 64. As will be appreciated from a consideration of FIG. 3B, the outer pawl width "D" is preferably greater than the inner pawl width "E". Accordingly, the gear segment 78 may advantageously be provided with an increased number of pawl teeth 80 thereon, such that each pawl 64 might more securely engage the ring gear 60 in locked relation (as will be discussed in greater detail hereinbelow).

Figure 3B:
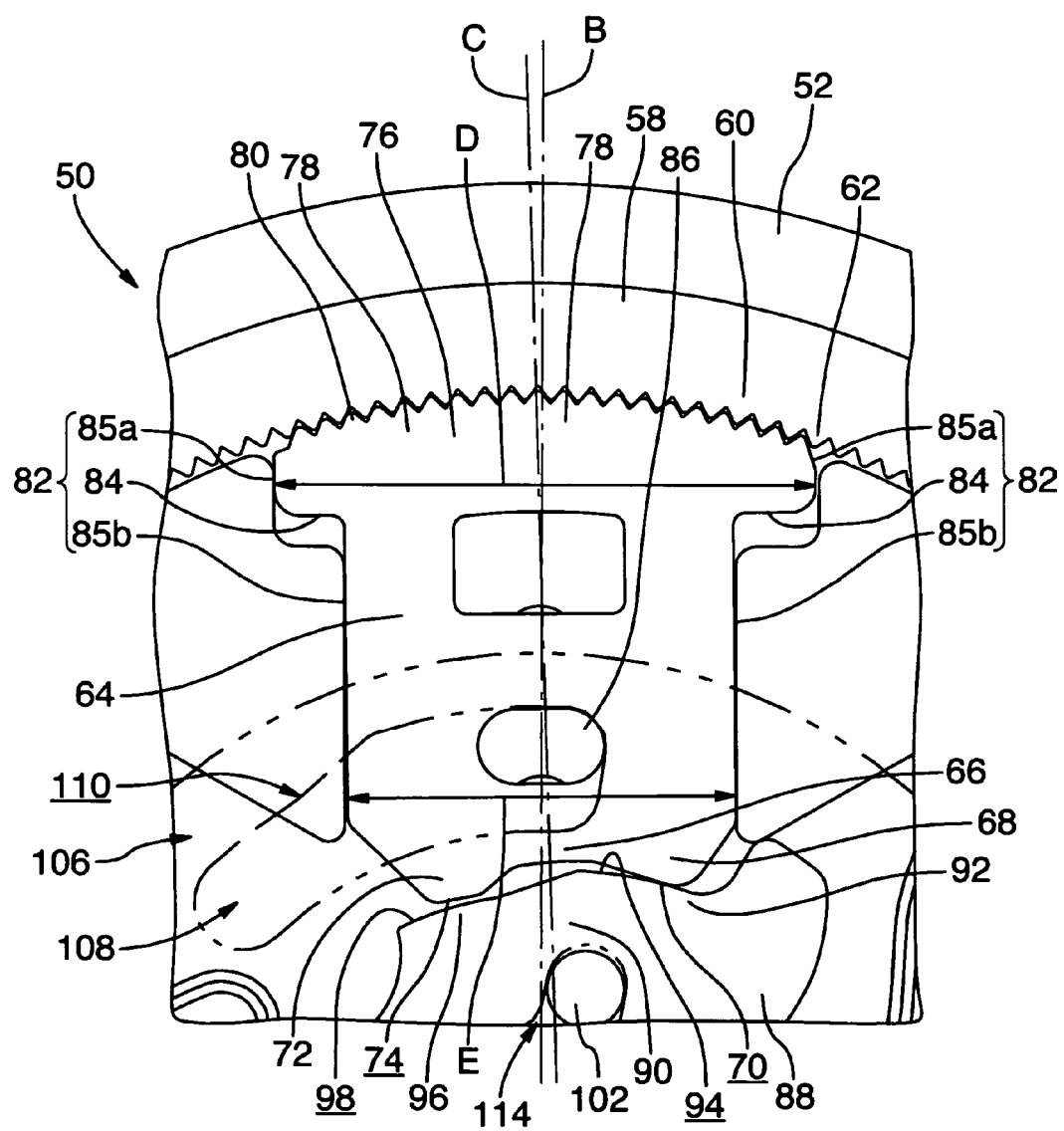
FIG. 3B is an enlarged view of the dotted area 3B of FIG. 3A.
Figure 4B:
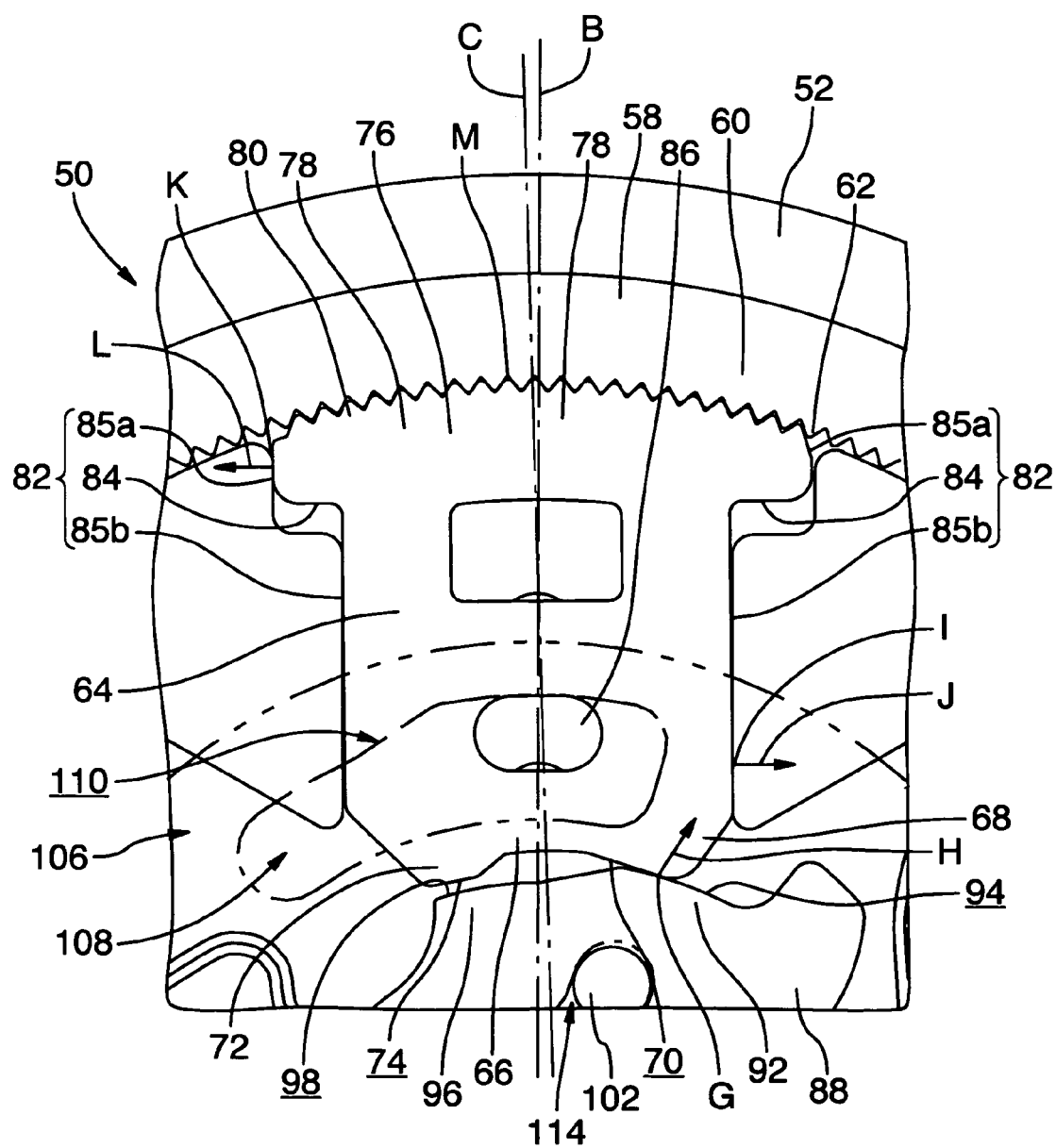
FIG. 4B is a view, similar to FIG. 3B, of the rotary recliner mechanism shown in FIG. 4A.
Figure 5A:
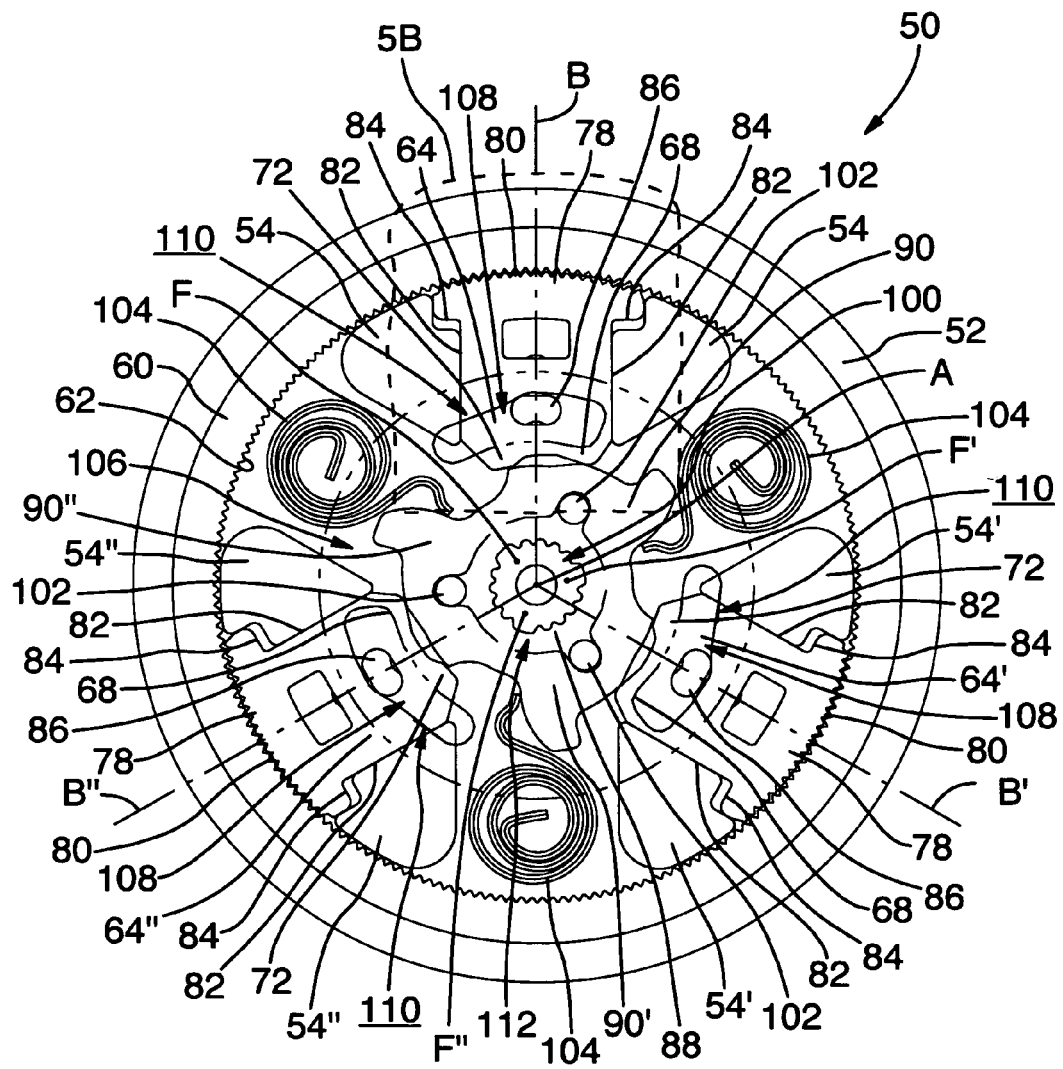
FIG. 5A is a view similar to FIG. 3A, with the rotary recliner mechanism shown in intermediate position.
Figure 5B:
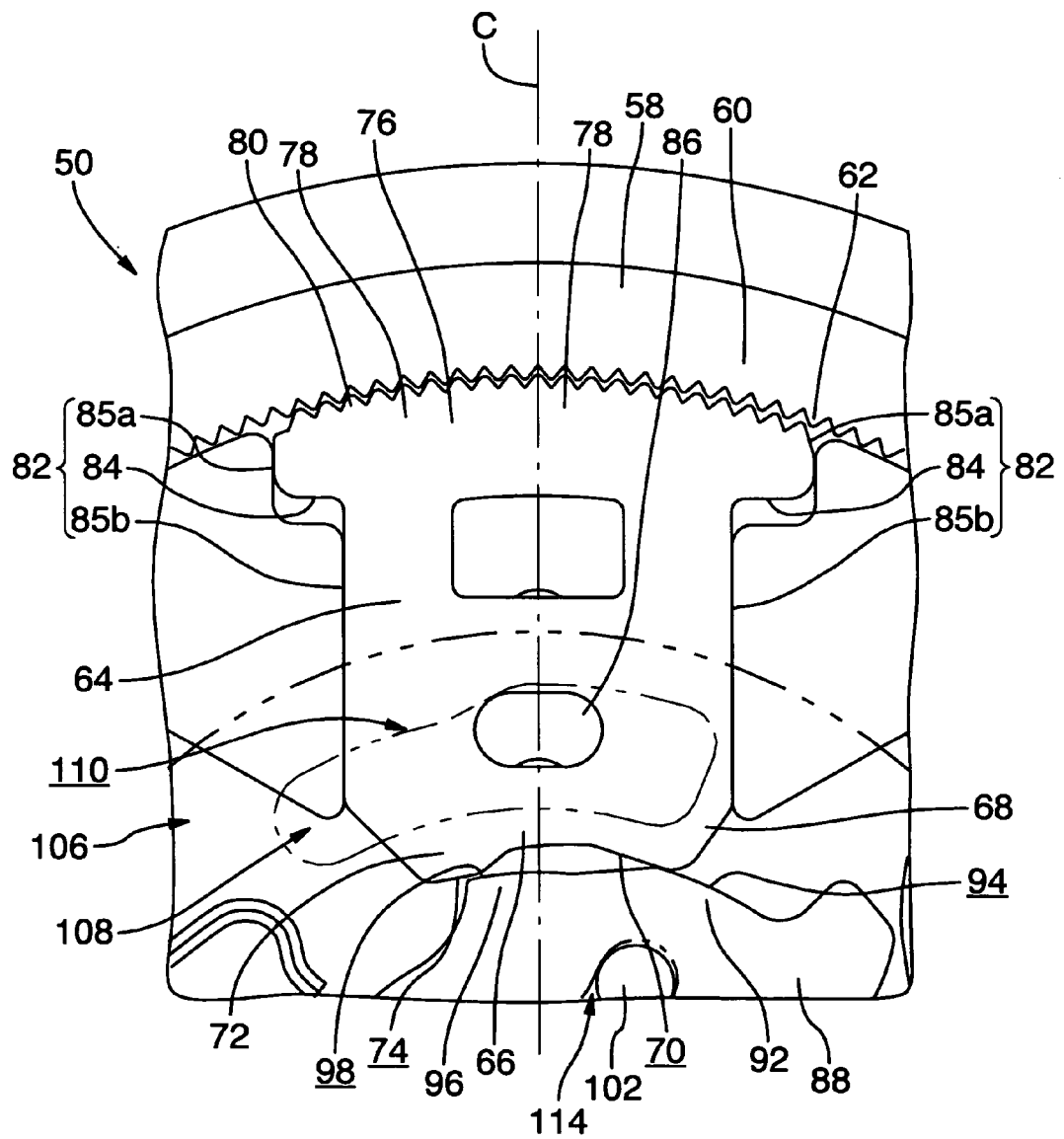
FIG. 5B is a view, similar to FIG. 3B, of the rotary recliner mechanism shown in FIG. 5A.

Preferably, and as best seen in FIGS. 3B and 4B, each locking pawl 64 includes a driven lobe 68 that is arranged on the inner end portion 66 of the pawl 64 in substantially off-set relation from the longitudinal pawl axis "C". The driven lobe 68 of each pawl 64 includes a cam-follower surface 70.

As best seen in FIG. 8, the cam member 88 of the rotary recliner mechanism 50 is substantially planar. The cam member 88 is mounted substantially transverse to, and for rotation about, the pivot axis "A". As best seen in FIG. 8, the cam member 88 includes three foot portions 90, 90', 90". Each one of the foot portions 90, 90', 90" is substantially identical in structure to each other one, and each interacts with a respective one locking pawl 64, 64', 64" (as will be described in considerably greater detail hereinbelow) in a functionally analogous manner to that of the others. As such, references hereinafter to any single one of the foot portions 90, 90', 90", or to the interaction thereof with any of the other components of the rotary recliner mechanism 50, should be interpreted to apply, with any necessary and/or minor variations, to each of the other foot portions. As best seen in FIGS. 3B and 4B, each foot portion 90 is provided with active and passive lobes 92, 96 arranged thereon. The active lobe 92 of each foot portion 90 includes a camming surface 94 that, as will be appreciated from a consideration of FIGS. 3A through 7B), is arranged eccentrically of the pivot axis "A".

Figure 6A:
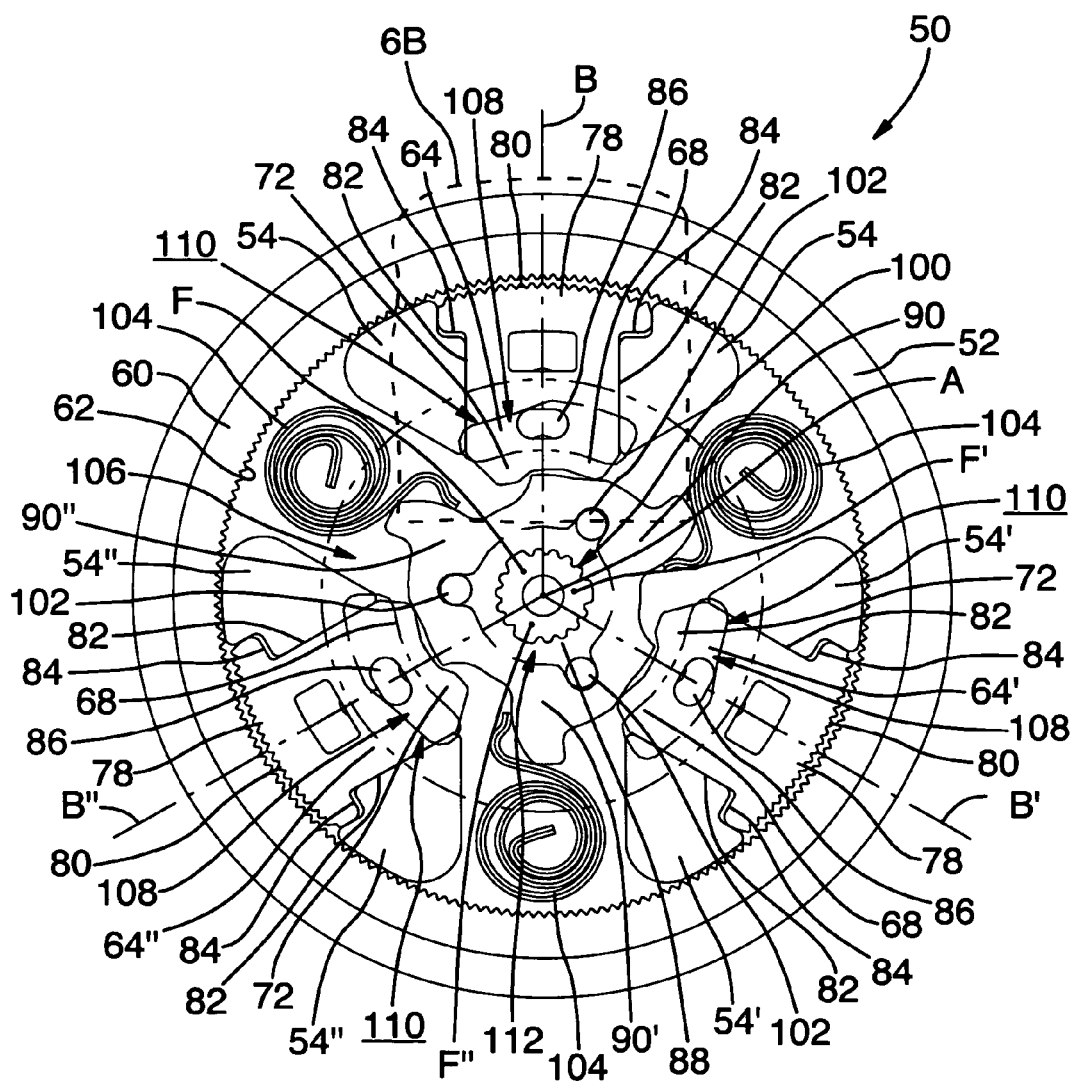
FIG. 6A is a view similar to FIG. 3A, with the rotary recliner mechanism shown in a first unlocked position.
Figure 6B:
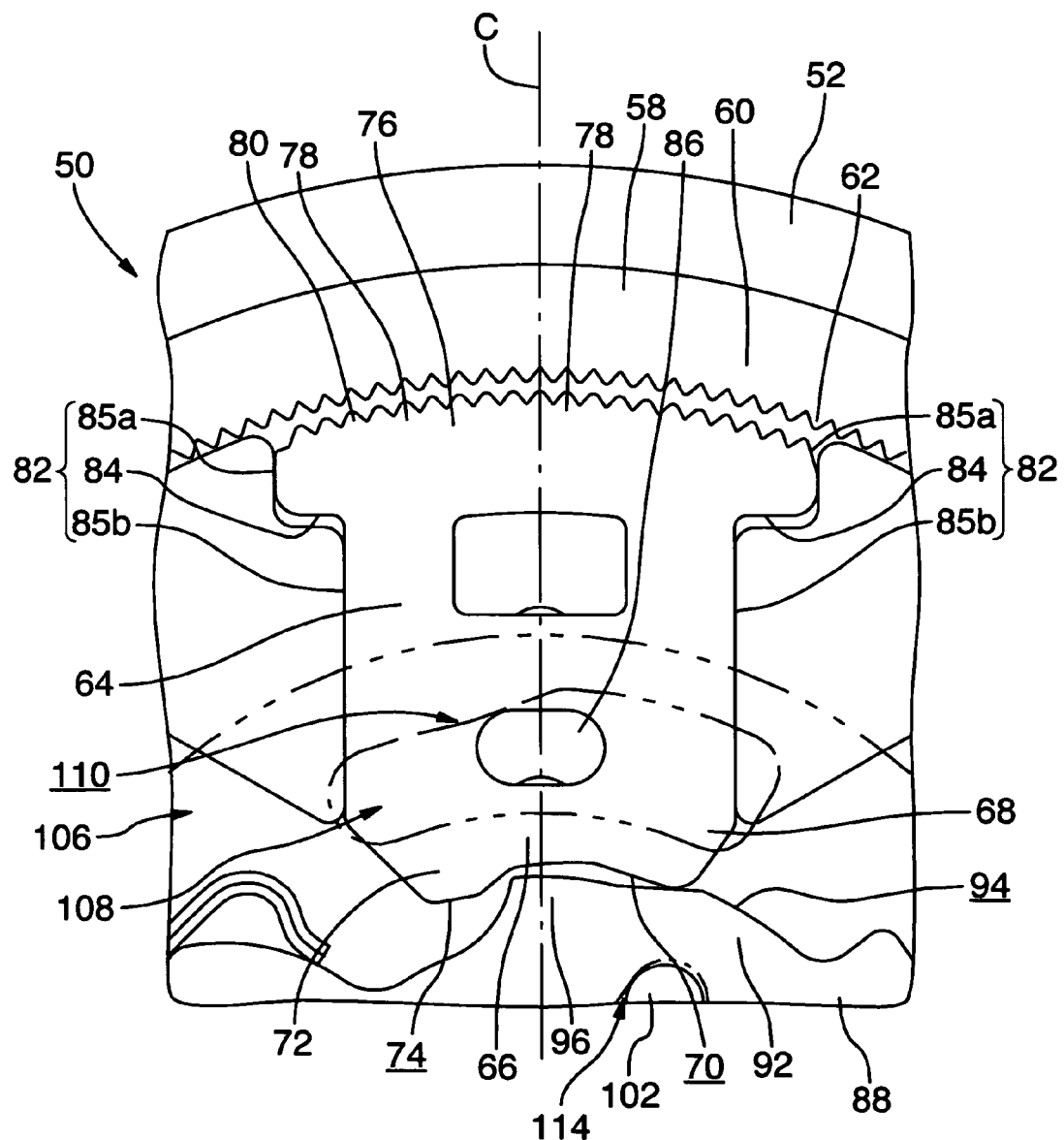
FIG. 6B is a view, similar to FIG. 3B, of the rotary recliner mechanism shown in FIG. 6A.
Figure 7A:
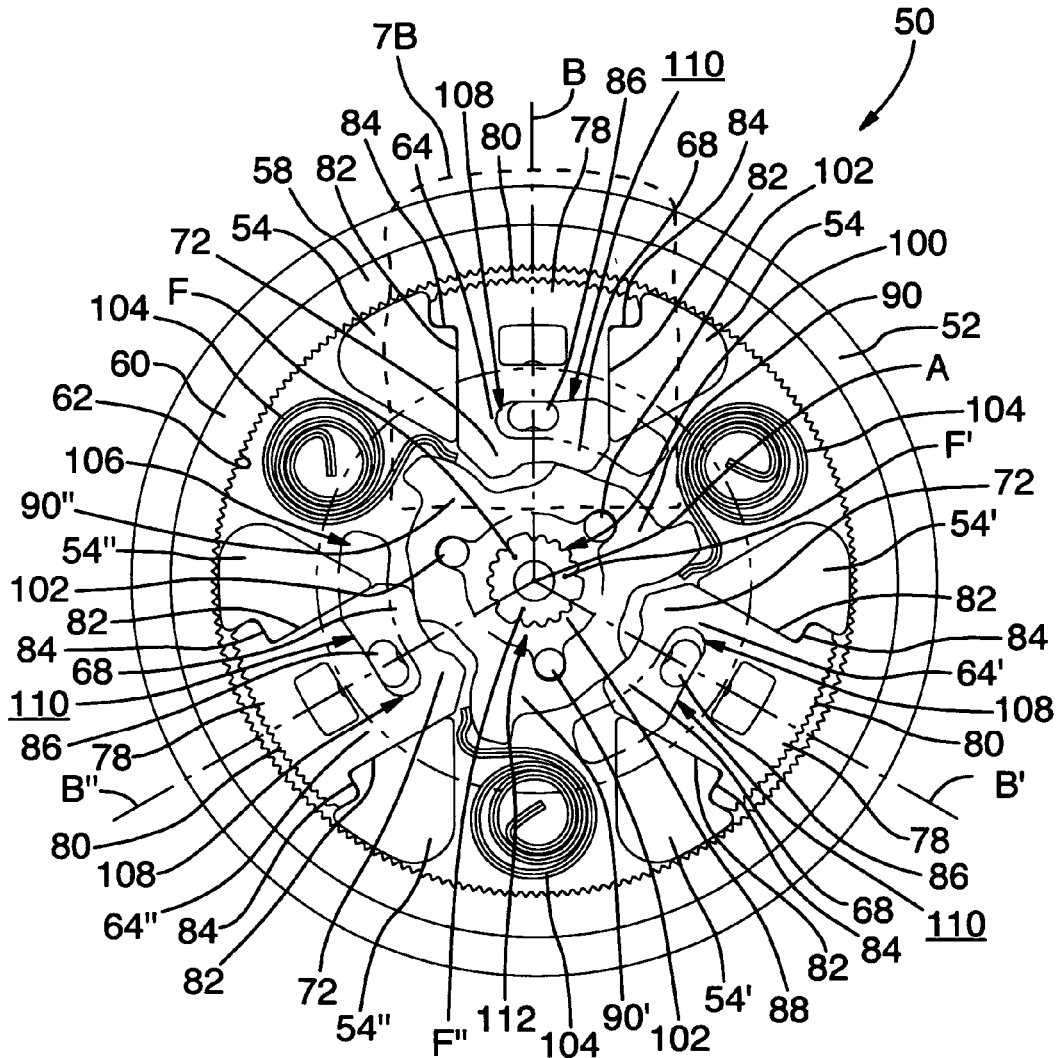
FIG. 7A is a view similar to FIG. 3A, with the rotary recliner mechanism shown in an fully withdrawn and unlocked position.
Figure 7B:
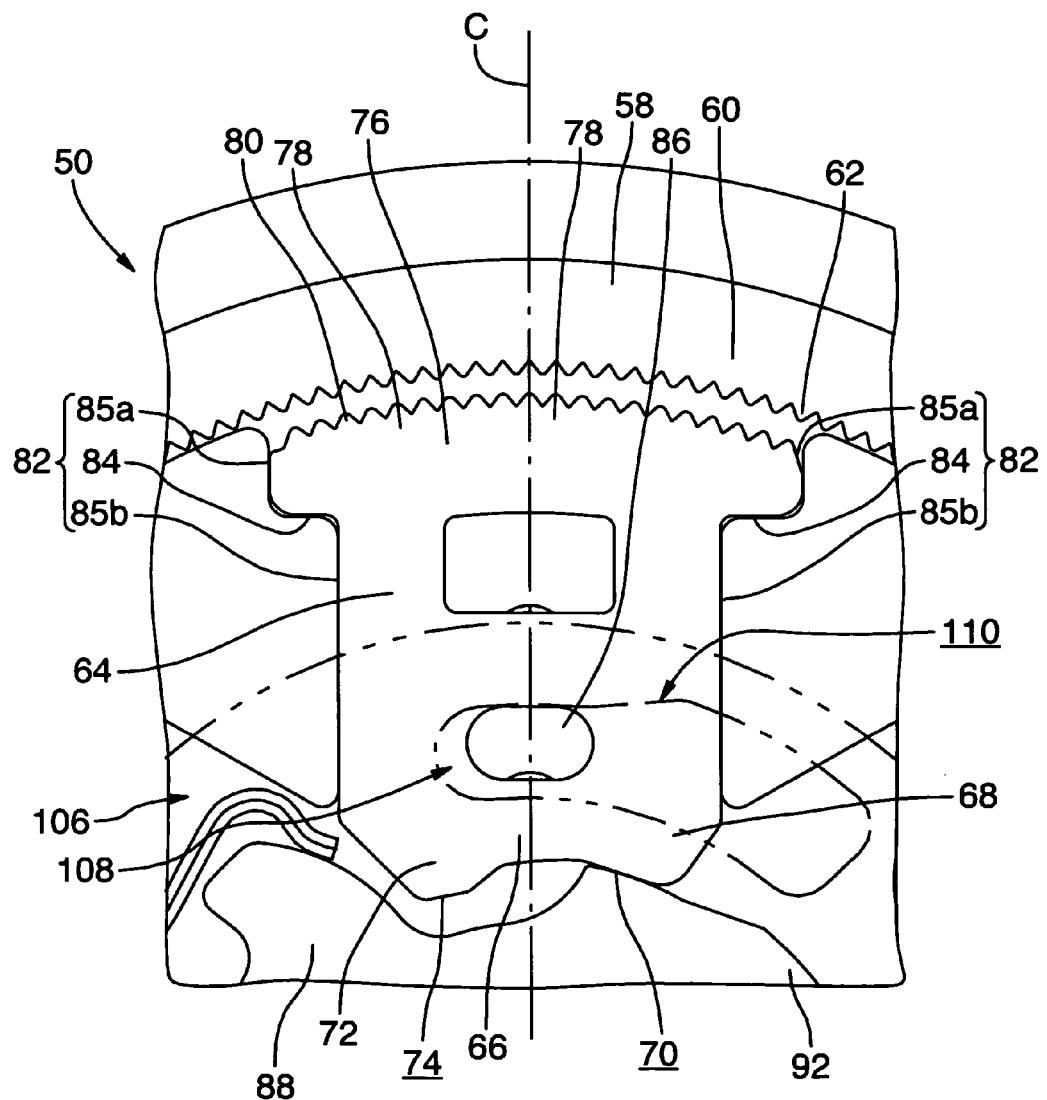
FIG. 7B is a view, similar to FIG. 3B, of the rotary recliner mechanism shown in FIG. 7A.

From FIGS. 3A through 7B, it will be appreciated that the cam member 88 rotates, relative to the first and second plate members 52, 58, between a lock traversing position (shown in FIGS. 3A and 3B) and a fully withdrawn and unlocked position (shown in FIGS. 7A and 7B). In passing from the former towards the latter, and as will be described in considerably greater detail hereinbelow, the cam member 88 preferably traverses, in sequence, a design locked position (shown in FIGS. 4A and 4B), an intermediate position (shown in FIGS. 5A and 5B), and a first unlocked position (shown in FIGS. 6A and 6B).

Preferably, and as best seen in FIG. 4A, each of the spring members 104 of the rotary recliner mechanism 50 engages the cam member 88, and together, they bias the cam member 88 towards the design locked position that is shown in FIGS. 4A and 4B.

As best seen in FIG. 2, the rotary recliner mechanism 50 also includes a handle control means 118 which, as will be described in greater detail hereinbelow, is selectively operative to move the cam member 88 from the design locked position (shown in FIGS. 4A and 4B) towards the fully withdrawn and unlocked position (shown in FIGS. 7A and 7B), i.e., against the biasing of the spring members 104. In this manner, actuation of the handle control means 118 also controls pivotal movement of the seat back member 26 about the pivot axis "A" relative to the seat cushion member 22. More specifically, and as shown in FIG. 2, the handle control means 118 preferably includes a handle portion 120 mounted to the seat back frame (not shown) of the seat back member 26. Pivotal movement of the handle portion 120 is transferred through cabling 122 (shown in FIG. 2) to an actuating pin member (not shown) of the handle control means 118. As best seen in FIGS. 8 and 10, the cam member 88 is shaped to define a central aperture 100 therethrough for secure engagement with the actuating pin member (not shown) of the handle control means 118. As will be described in greater detail hereinbelow, a vehicle seat user (not shown) may grasp and pivot the handle portion 120 to rotate the cam member 88 towards the fully withdrawn and unlocked position of FIGS. 7A and 7B, so as to enable pivotal movement of the seat back member 26 about the pivot axis "A" relative to the seat cushion member 22.

In use, and in the design locked position that is shown in FIGS. 4A-4B, the pawl teeth 80 on the gear segment 78 of each pawl 64 securely engage the ring gear 60 in locked relation. Additionally, each camming surface 94 of the cam member 88 engages the cam-follower surface 70 on a respective one of the pawls 64 at a cam contact point "G" (as shown in FIG. 4B) in the design locked position. Preferably, and as best seen in FIG. 4B, each pawl 64 is advantageously engaged by the cam member 88 solely at the cam contact point "G". The camming surface 94 exerts a camming force on the driven lobe 68 of the pawl 64 in the direction generally indicated by arrow "H" in FIG. 4B. Though not essential to the working of the invention, the camming force "H" is generally thought to impart a rotational moment of force to the pawl 64. More specifically, in the design locked position and as best seen in FIG. 4B, the inner side 85b of the side edge 82 that is adjacent to the driven lobe 68 on the pawl 64 is urged into abutting relation with, and exerts an inner pawl force (as indicated generally by arrow "J") upon, the adjacent guide 54 at a guide inner contact point "I". The outer side 85a of the other side edge 82 on the pawl 64 is urged into abutting relation with, and exerts an outer pawl force (as indicated generally by arrow "L" in FIG. 4B) upon, an adjacent guide 54 at a guide outer contact point "K".

Accordingly, in the design locked position and as best seen in FIG. 4B, the longitudinal pawl axis "C" of the pawl 64 is substantially askew (hereinthroughout, alternately referred to as "angularly offset") relative to the radial axis B. It will, therefore, be appreciated that the rotation of the pawl member 64 relative to the guide pair 54,54 may advantageously eliminate any clearances therebetween, and bring the pawl teeth 80 into locking engagement with the teeth on the ring gear 60 at a primary ring gear contact point "M". In this manner, rotation of the second plate member 58 about the pivot axis "A" is substantially restrained relative to the first plate member 52. As such, in the design locked position, the seat back member 26 is not permitted to rotate relative to the seat cushion member 22 of the vehicle seat assembly 20.

In order to unlock the seat back member 26 for pivotal rotation relative to the seat cushion member 22, the user (not shown) grasps and pivots the handle portion 120 so as to rotate the cam member 88 about the pivot axis "A" as described hereinabove. Notably, and as described more fully hereinbelow, the mask member 106 of the rotary recliner mechanism 50 is substantially planar (as best seen in FIG. 8), and it rotates in coincident relation with the aforesaid rotation of the cam member 88. More specifically, and as best seen in FIG. 8, three protuberances 102 extend outward from the plane defined by the cam member 88 in a direction substantially parallel to the pivot axis "A". The mask member 106 is shaped to define a central mask aperture 112, with three furrowed portions 114 thereof being spaced about the pivot axis "A". Each of the furrowed portions 114 of the mask member 106 securely engages one of the protuberances 102 of the cam member 88, so as to enable the aforesaid coincident rotation of the one with the other.

During rotation of the cam member 88 from the design locked position towards the fully withdrawn and unlocked position, and as best seen in FIGS. 5A through 7B, each of the inclined guide surfaces 110 of the mask member 106 (alternately hereinafter referred to as the gear releasing means 106) engages a respective mask engaging tongue member 86 formed one each on the pawls 64, 64', 64". Upon continued coincident rotation of the cam member 88 and mask member 106 towards the intermediate position shown in FIG. 5B, each tongue member 86 is translated radially inward along the inclined guide surface 110 of the mask member 106, such as to remove each pawl 64 and its gear segment 78 from locked relation with the ring gear 60.

With further rotation of the handle portion 120, the mask member 106 continues to withdraw each pawl 64 along its corresponding guide channel 56, until the pawl teeth 80 are substantially clear of the teeth 62 on the ring gear 60 in the first unlocked position that is shown in FIGS. 6A and 6B. More specifically, in the first unlocked position, each gear segment 78 is removed from the ring gear 60, so as to clearly enable rotation of the second plate member 58 about the pivot axis "A" relative to the first plate member 52. As such, in the first unlocked position, the seat back member 26 may be pivoted relative to the seat cushion member 22 of the vehicle seat assembly 20.

From the first unlocked position shown in FIGS. 6A and 6B, the handle portion 120 and mask member 106 may preferably be still further rotated into the fully withdrawn and unlocked position that is shown in FIGS. 7A and 7B. In this position, and much the same as in the first unlocked position that is discussed hereinabove, each gear segment 78 is removed from the ring gear 60, so as to enable rotation of the second plate member 58 about the pivot axis "A" relative to the first plate member 52, and such that the seat back member 26 may be pivoted relative to the seat cushion member 22 of the vehicle seat assembly 20. As shown in FIGS. 7A and 7B, each pawl 64 is located, in the guide channel 56, with its shoulder portions 84,84 in substantially abutting relation against corresponding shoulders formed on the guide pair 54,54. Additionally, and as best seen in FIG. 7B, the mask engaging tongue member 86 of the pawl 64 is translated to a substantially radially inward position along the inclined guide surface 110 of the mask member 106.

With the cam member 88 of the rotary recliner mechanism 50 rotated to either the first unlocked position (shown in FIGS. 6A and 6B) or the fully withdrawn and unlocked position (shown in FIGS. 7A and 7B), the user may pivot the seat back member 26 of the vehicle seat assembly 20 into a desired position. Thereafter, upon release of the handle portion 120 by the user, the rotary recliner mechanism 50 will preferably naturally return, under biasing of the spring members 104, towards the design locked position shown in FIGS. 4A and 4B.

From the design locked position, the user (not shown) may preferably also actuate the handle portion 120 so as to rotate the cam member 88, away from the first unlocked position, towards the lock traversing position that is shown in FIGS. 3A and 3B. In this position, and much the same as in the design locked position that is discussed hereinabove, the pawl teeth 80 on the gear segment 78 of each pawl 64 securely engage the ring gear 60 in locked relation, and the longitudinal pawl axis "C" of the pawl 64 is substantially askew relative to the radial axis B. As such, rotation of the second plate member 58 about the pivot axis "A" is substantially restrained relative to the first plate member 52, and the seat back member 26 is not permitted to rotate relative to the seat cushion member 22 of the vehicle seat assembly 20. Though not essential to the working of the invention, in the lock traversing position and as best seen in FIG. 3A, each pitch center F, F', F" is substantially off-set from its respective radial axis B, B', B".

From the foregoing, it will be appreciated that rotation of the cam member 88 is adapted to selectively control pivotal movement of the seat back member 26 about the pivot axis "A" relative to the seat cushion member 22.

It is also notable that each pawl 64 also includes a back-up lobe 72 that is arranged on the inner end portion 66 in opposing relation to the driven lobe 68 (i.e., on the opposite side of the pawl axis "C"). The back-up lobe 72 includes a back-up surface 74 which is shaped, dimensioned, and/or otherwise adapted to engage a safety stop surface 98 that is provided on the passive lobe 96 of each foot portion 90. Preferably, and advantageously, the back-up surface 74 only engages the safety stop surface 98 during a mechanism overload event (not shown), such as, for example, in a vehicle crash situation or upon the occurrence of another event that is sufficient to temporarily or permanently deform the rotary recliner mechanism 30.

In view of all of the above, it will be appreciated that the rotary recliner mechanism 50 of the present invention permits the seat back member 26 to be selectively reclined, about the horizontal pivot axis "A", through a range of substantially upright, occupiable positions for selection by the user of a preferred seating position. The rotary recliner mechanism 50 of the present invention is generally thought to be an effective way to provide such reclining functionality in vehicle seat assemblies 20. Advantageously, the rotary recliner mechanism 50 of the present invention is relatively inexpensive to manufacture, it has its working components substantially enclosed (lending to its reliability and safety), and it fits into a relatively small design envelope. It is generally thought that the rotary recliner mechanism 50 of the present invention may, notably, exhibit a significantly reduced range of non-locking conditions and/or tooth-to-tooth collisions, and may enable more ready locking when the handle portion 120 is released, preferably without requiring the application of rearward or forward forces upon the seat back member 26 to positively lock the rotary recliner mechanism 50. Accordingly, the rotary recliner mechanism 50 of the present invention is generally thought to afford advantages from a safety perspective.

Additionally, the rotary recliner mechanism 50 of the present invention does not require the application of an equilibrium of forces to each of the pawls 64, and it is generally thought that the tolerancing between the cam member 88 and the driven lobes 68 on the pawls 64 may be seen to be relatively inexpensive to manufacture and readily achievable in mass-production, with a relatively low incidence of component rejection and/or failure. As such, it is generally thought that the rotary recliner mechanism 50 of the present invention may be both highly reliable and cost effective, while at the same time affording a low incidence of non-locking conditions. Accordingly, it will be appreciated that the rotary recliner mechanism 50 of the present invention obviates or mitigates at least one of the above-mentioned disadvantages of the prior art.

Other modifications and alterations may be used in the design and manufacture of other embodiments according to the present invention without departing from the spirit and scope of the invention, which is limited only by the accompanying claims. For example, and as will be appreciated by those skilled in the art, the spring members 104 (alternately hereinafter referred to as the cam biasing means 104) need not be provided in the exact form shown in FIGS. 4A and 4B. Moreover, and for example, the cam biasing means 104 might instead be provided as a differently pre-loaded biasing means or as a gravity biasing means (not shown). By way of a further example, the handle portion 120 might alternately be mounted to the seat cushion member 22 or even directly to the rotary recliner mechanism 50. Still further, and as is generally well-known in the art, the handle control means 118 might be electrically actuated from a switch (not shown) mounted on the seat cushion member 22 or elsewhere. Given the great number of modifications which are possible, of the which the preceding few are merely examples, it should perhaps be noted once again that other modifications and alterations may be used in the design and manufacture of the rotary recliner mechanism 50 according to the present invention without departing from the spirit and scope of the invention, which is of course limited only by the accompanying claims.

I claim:

1. A rotary recliner mechanism for pivotally interconnecting a seat back member and a seat cushion member of a vehicle seat assembly, with said rotary recliner mechanism comprising:
  a) first and second plate members adapted to be securely mounted one each on the seat cushion member and the seat back member, with said second plate member rotatably supported by said first plate member so as to define a substantially horizontal seat pivot axis, with a ring gear formed on said second plate member, and with a first pair of elongate guide members formed on said first plate member, with said pair defining a guide channel therebetween that is oriented along a substantially radial axis;
  b) an elongate first locking pawl having a longitudinal pawl axis and being disposed within said guide channel for sliding movement therealong, with said pawl having:
    i) inner and outer end portions, with said outer end portion located radially outward of said inner end portion, and with said outer end portion having a gear segment formed thereon that is engageable with said ring gear in locked relation;
    ii) a pair of opposite side edges slidably engagable with said pair of elongate guide members, with each of said opposite side edges extending between said inner and outer end portions; and
    iii) a driven lobe arranged on said inner end portion in substantially off-set relation from said longitudinal pawl axis, with said driven lobe including a cam-follower surface;
  c) a cam member mounted for rotation about said pivot axis between a locked position and an unlocked position relative to said first and second plate members, with said cam member having a first foot portion that is provided with an active lobe arranged thereon, with said active lobe including a camming surface that is arranged eccentrically of said pivot axis and is engagable with said cam-follower surface;
    wherein, in said locked position, said camming surface engages said cam-follower surface, with said pawl being engaged by said cam member solely at said cam-follower surface, and with said longitudinal pawl axis being substantially askew relative to said radial axis, such that said gear segment securely engages said ring gear in said locked relation, and such that rotation of said second plate member about said pivot axis is substantially restrained relative to said first plate member;
    wherein, in said unlocked position, said gear segment is removed from said ring gear, so as to enable rotation of said second plate member about said pivot axis relative to said first plate member; and
    wherein said rotation of said cam member selectively controls pivotal movement of the seat back member about said pivot axis relative to the seat cushion member.

2. A rotary recliner mechanism according to claim 1, wherein each of said side edges comprises an intermediate shoulder portion, so as to define, between said opposite side edges of said pawl, first and second pawl widths substantially adjacent to said inner end portion and to said outer end portion respectively, and wherein said second pawl width is greater than said first pawl width.

3. A rotary recliner mechanism according to claim 2, wherein in said locked position, each of said opposite side edges engages a respective one of said guide members in substantially abutting relation, with a first one of said opposite side edges engaging its said respective one of said guide members substantially adjacent to said inner end portion, and with a respective other one of said side edges engaging its said respective one of said guide members substantially adjacent to said outer end portion.

4. A rotary recliner mechanism according to claim 3, wherein said ring gear comprises a plurality of teeth defining a first pitch radius, and wherein said gear segment comprises a plurality of pawl teeth defining a second pitch radius, with said second pitch radius being smaller than said first pitch radius.

5. A rotary recliner mechanism according to claim 4, wherein said second pitch radius defines a pitch center that, in said locked position, is in substantially off-set relation from said radial axis.

6. A rotary recliner mechanism according to claim 5, further comprising a cam biasing means for biasing said cam member towards said locked position.

7. A rotary recliner mechanism according to claim 6, further comprising gear releasing means, operatively engagable with said pawl, for removing said gear segment from said locked relation with said ring gear during said rotation of said cam member towards said unlocked position.

8. A rotary recliner mechanism according to claim 1, wherein said foot portion of said cam member is further provided with a passive lobe arranged thereon, with said passive lobe including a safety stop surface, and wherein said pawl has a back-up lobe arranged on said inner end portion in substantially off-set relation from said longitudinal pawl axis and in substantially opposing relation to said driven lobe, with said back-up lobe including a back-up surface, and wherein said back-up surface is adapted to engage said safety stop surface during a mechanism overload event.

9. A rotary recliner mechanism according to claim 1, further comprising second and third locking pawls and corresponding second and third pairs of elongate guide members formed on said first plate member, with each of said second and third locking pawls being substantially identical in structure to said first locking pawl, with each of said second and third pairs of elongate guide members being substantially identical in structure to said first pair of elongate guide members, and wherein said cam member has second and third foot portions, with each of said second and third foot portions being substantially identical in structure to said first foot portion, such that said second and third foot portions respectively interact with said second and third locking pawls in a functionally analogous manner to said first foot portion with said first locking pawl.

10. A rotary recliner mechanism according to claim 9, wherein said first pair of elongate guide members is spaced 120 degrees about said pivot axis from each of said second and third pairs of elongate guide members.

11. A rotary recliner mechanism according to claim 10, further comprising a gear releasing means, operatively engageable with said pawl, for removing said gear segment from said locked relation with said ring gear during said rotation of said cam member towards said unlocked position; wherein said gear releasing means comprises a substantially planar mask member securely engaging said cam member in rotationally coincident relation therewith, with said mask member engaging said first locking pawl and said second and third locking pawls during said rotation of said cam member towards said unlocked position, so as to remove each said gear segment from said locked relation with said ring gear.

12. A rotary recliner mechanism according to claim 11, wherein each of said first pawl and said second and third locking pawls comprises a tongue member, and wherein said planar mask member is shaped to define three slots therethrough, with each of said slots having an inclined guide surface that engages a respective one said tongue member during said rotation of said cam member towards said unlocked position.

13. A rotary recliner mechanism according to claim 12, further comprising a cam biasing means for biasing said cam member towards said locked position; wherein said cam biasing means comprises one or more spring members engaging said cam member.

14. A rotary recliner mechanism according to claim 13, wherein said one or more spring members comprise three spring members.

15. A rotary recliner mechanism according to claim 14, wherein said first plate member is adapted to be securely mounted on the seat cushion member, and wherein said second plate member is adapted to be securely mounted on the seat back member.

16. A rotary recliner mechanism according to claim 15, further comprising a circumferential fastening ring rotatably connecting said first and second plate members to one another.

17. A rotary recliner mechanism according to claim 16, further comprising a handle control means operatively connected to said cam member for selective movement of said cam member, against said biasing of said spring members, from said locked position towards said unlocked position.

* * * * *